Figure 1:
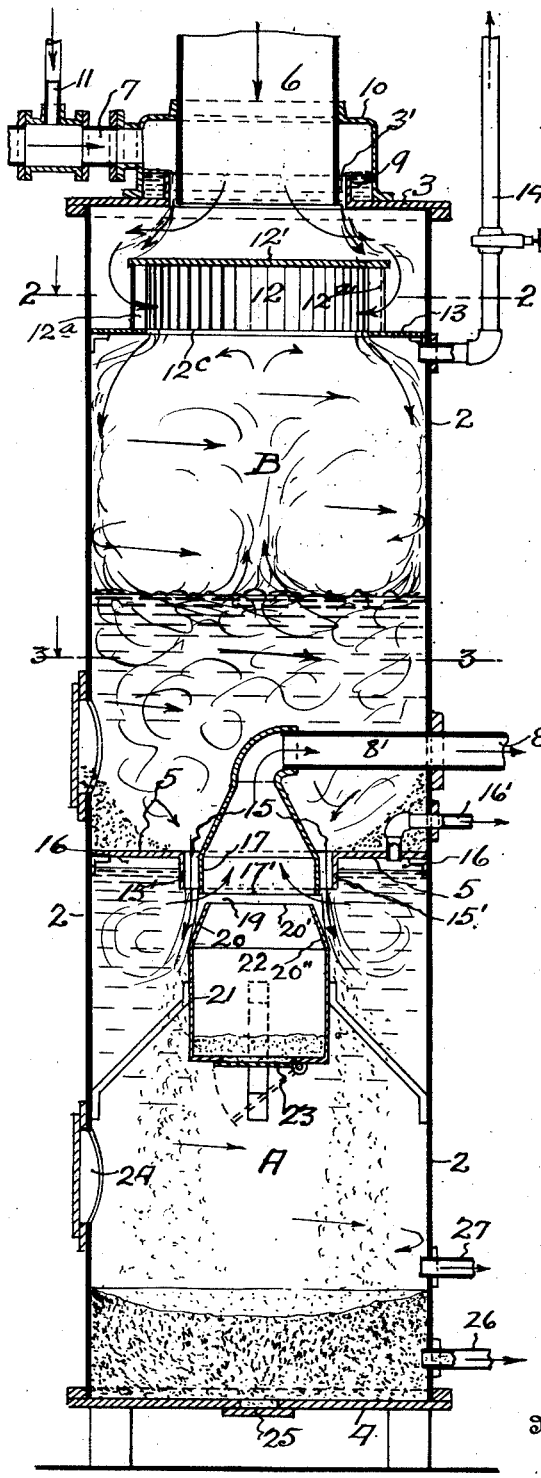

May 8, 1928.

C. G. HAWLEY 1,668,807

HOT FILTRATION

Filed July 30, 1926

2 Sheets-Sheet 1

Inventor

Charles G. Hawley

By C. A. Mason

Attorney

May 8, 1928.

C. G. HAWLEY 1,668,807

HOT FILTRATION

Filed July 30, 1926

2 Sheets-Sheet 2

Patented May 8, 1928.

1,668,807

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

HOT FILTRATION.

Application filed July 30, 1926. Serial No. 125,948.

The invention relates to the art of purifying water and its objects comprehend the provision of both an improved process and an improved apparatus whereby waters of all sorts may be economically, quickly and uniformly purified and made fit for use. By purification is meant the removal of the substances that contaminate and are foreign to the water.

Impurities are of two sorts, organic and inorganic. In every case purification properly has reference to the removal of the particular substances that would be detrimental in that particular use. In some cases it is necessary to remove only those which, at given characteristic temperatures, are present in the form of precipitable solids. Other cases require the removal of impurities of less weight and others of fluid form, either lighter or heavier than the water, and sometimes both. In still other cases the water must be freed from contaminating or destructive gases. And in still other cases the purpose will be to remove all such impurities, to the end that the water may be used in processes or in apparatus demanding complete freedom from interference by foreign substances. The operation of steam boilers for long periods and at high ratings is a notable instance of the need for the best conditioned water that can be obtained, and by way of example, will be enlarged upon herein.

As to its most exacting uses, the dependability of the process if based upon the fact that practically all of the impurities in water are conditioned for separation if and when the water is raised to a temperature of 360° F. or higher; and, that the separation at that and lower temperatures can be brought about directly at the top and bottom of the body of hot water, according to respective impurities, without vaporizing the water and hence without expending the heat that would be required to overcome the latency of the water and convert it into steam.

Therefore this invention is known as a process of hot filtration and is not to be confused with the ordinary processes of distillation, which require much greater expenditures of heat and make the ultimate conservation of the heat more difficult. Further, this is a process of purification which comprehends a positively accomplished step that hastens and ensures the quiet separation of the impurities; and is thereby again clearly distinguished from mere distillation and also from ordinary feed water heating processes, in all of which the water under treatment is in a constantly agitated state that precludes effective separation.

Though first intended for the purification of water this invention is not limited thereto. In treating other liquids by this process each is given a working temperature that is characteristic of or incident to the impurities to be removed and in other respects the process proceeds exactly as hereinafter disclosed. Further by governing the temperature of the liquid, whatever its kind, the deposition of the objectionable constituents may be ensured and constituents that would respond to higher temperatures may be permitted to remain in the purified liquid. This last clearly shows that the process need not be worked at maximum temperatures and pressures and easily may be accommodated to many special uses.

Figure 2:
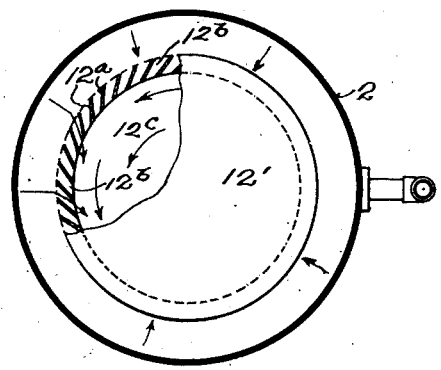
Figure 3:
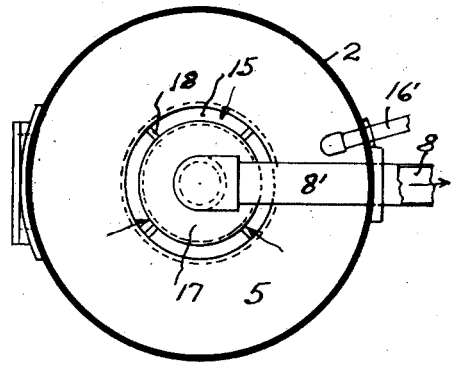
Figure 4:
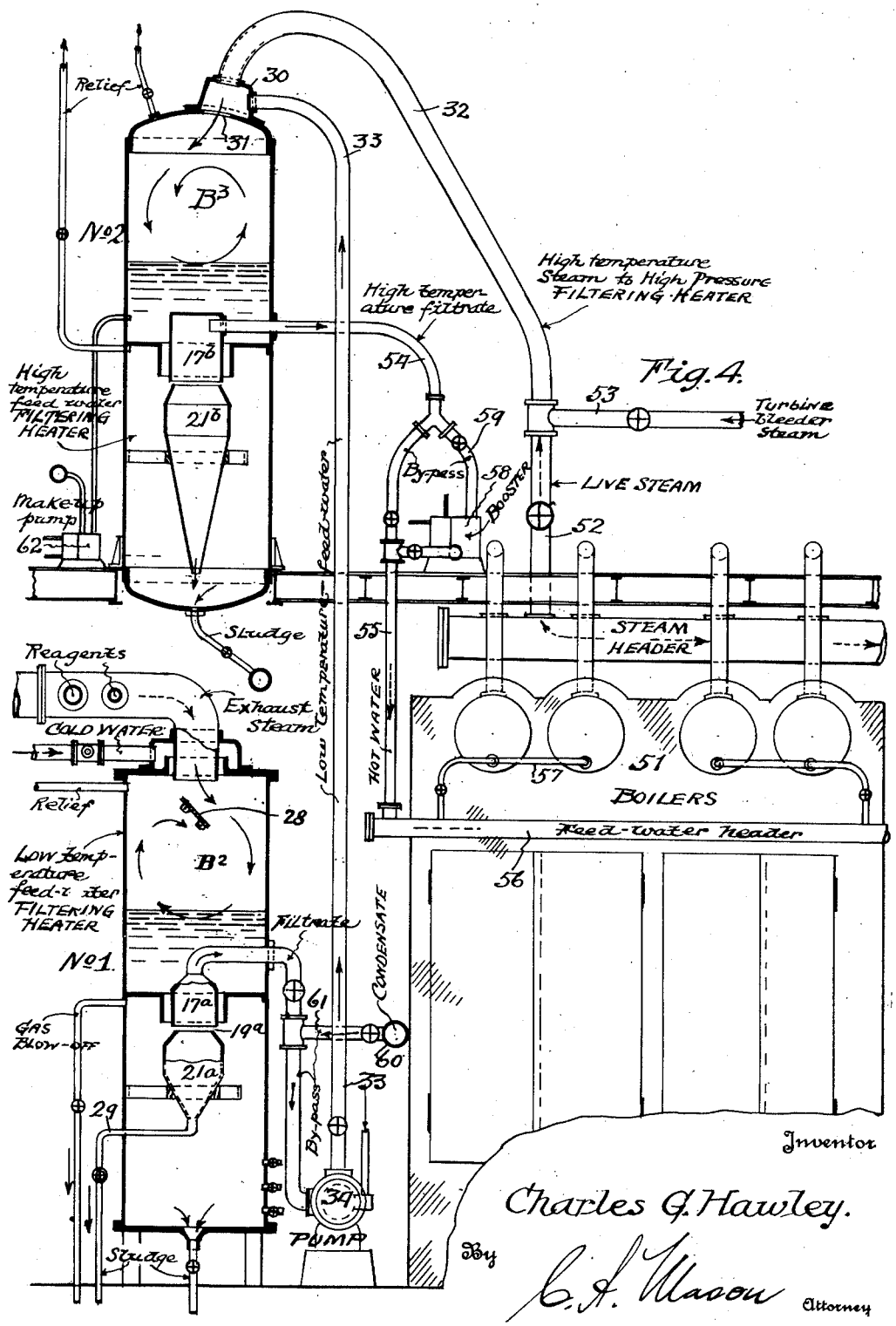

The mechanical nature of the invention, the process involved and its further objects will all be clearly understood on reference to the drawings that form part of this specification; and in which, Fig. 1 is a vertical section of an exemplary water purifier adapted to work at relatively low temperatures, such as the temperature of steam at approximately atmospheric pressure; Fig. 2 is a horizontal section of the machine on the line 2—2 of Fig. 1; Fig. 3 is a horizontal section thereof on the line 3—3 of Fig. 1; Fig. 4 illustrates the employment of tandem water purifiers, at successively higher temperatures, and incidentally illustrates a boiler house which contains a complete installation of the invention in the best form devised to date, providing not alone for a supply of pure water to the boilers but also for the conservation of the heat of both high and low pressure steam at the various temperatures available from the steam plant.

The description of the mechanical elements of the system will include a general description of the process, and further the process will be concisely set forth in a way which will make it clearly understood and at the same time accentuate the merits of the illustrated apparatus.

While the treatment of boiler feed water and the conservation of waste steam heats are of much importance, the invention will first be described as to its primary uses in the purification of water without regard to the use to be made thereof. In many cases a pure water is the only product immediately required and while some expense is involved the pure water itself is well worthy of the expense; and obviously, the heat present in the outgoing pure water if not to be used therewith may be conserved by the use of any suitable heat interchanger that will impart that heat to the cool water entering the process.

As illustrated in the drawings, the water purifiers of this invention are of a vertical or of a column-like form which occupies little floor space and yet is of large capacity. Each is distinguished by a settling chamber in which the gravity separation of the impurities is completed and from the upper part of which the clear water is removed. Each purifier is also distinguished by a heating chamber that is superimposed upon the settling chamber. This explains the height of the purifier. The lower part of the heating chamber is in direct communication with the upper part of the settling chamber.

The water from the heating chamber descends into the settling chamber and is directed downward past or beyond the clear water offtake. The lighter impurities rise into the upper part of the settling chamber and to a level above that of the offtake. The heavier impurities sink to the bottom.

The communication between the upper and lower chambers is so restricted that the violent agitation consequent upon the heating of the body of water in the upper chamber is only to a very small extent communicated to the water in the settling chamber. The water in the settling chamber should remain substantially quiescent if the continuous and permanent gravity separation of the impurities is to be accomplished in the substantially perfect manner characteristic of this invention. But it is preferred that the construction of the purifier shall be such that this close restriction of the agitation shall not prevent the free communication of the heat from the upper chamber to the contents of the lower chamber.

In addition to the foregoing, the invention comprehends a number of novel constructions that will be found of particular advantage in carrying out the process in its several phases and uses.

The application of heat externally to a purifier of the above description would be accompanied by many objectionable mechanical and operating complications and would be economically wasteful. The invention therefore employs a direct interchange of heat between steam, at a suitable temperature, and the water to be purified. In other words, the heating of the water comprises the step of utilizing the impure water to condense and therefore accept heat from a proportioned volume of steam, coupled with the holding of the water and steam under the pressure incident to the maintenance of the predetermined temperature therein. The water under treatment is held at the predetermined temperature and coincident pressure throughout the process and until the clear water is discharged from the purifier. The impure water and the steam enter the purifier continuously, being properly proportioned; and likewise the discharge of pure water is continuous.

The temperature determined upon is that at which the water most freely relinquishes the impurities to the extent required, and is secured by the mere act of supplying to the purifier a super-abundance of steam at a pressure and consequent temperature that will at once hold the steam and water at the predetermined temperature. In brief the temperature of the water is determined by the volume and temperature of the steam that is supplied for mixture with the water and consequent condensation.

Obviously the capacity of the purifier, as measured by the volume of pure water delivered therefrom, is initially determined by the efficiency of the heat interchanger therein. Hence in the present invention special attention is given to the provision of heat exchanging means of the highest possible capacity and efficiency.

Any suitable means may be employed for regulating the supply of steam and supply of water, also the offtake of pure water.

The working temperature fixed with relation to a given liquid is that which best ensures quick chemical reactions therein and the free relinquishment of the impurities. The heating of the liquid reduces the time required for separation and the temperature to which the liquid is raised determines the kinds and character of impurities eliminated.

A controlling theory of this invention is that the heating of the water so reduces its tension that it can no longer sustain the impurities in suspension or in a state of permanent occlusion; and, that if the temperature be raised to or above 360° F. practically all impurities are rendered easily separable. This theory appears to be supported by the purifying effects gained by the expenditure of a minimum of heat as hereinafter described, and without resort to the creation of steam bubbles in the water under treatment.

Those persons who are skilled in the art will as a matter of course understand that many impurities encountered in water and in other liquids are separable at lower temperatures and that certain impurities must indeed be recovered or removed at lower temperatures than those indicated for the final purification of water. Therefore in practicing this invention it will often be found desirable to divide the process of purification into two or more stages having successively higher characteristic temperatures; and further, such sub-division of the process will be found particularly desirable when steam supplies of different temperatures are available for use in the successive stages.

The utilization of steam as the heating medium leads directly to the utilization of this invention as a means of conserving in greater measure steam heats now wasted or not fully utilized in and about steam plants; and this, coupled with the ability to continuously furnish an unlimited supply of uniformly pure water, ideally suits the invention for use in furnishing hot feed water to boilers. Thereby, the completion of a proper heat cycle may be accomplished and the maintenance of an efficient heat balance is made definite.

Refer now to Figs. 1, 2 and 3. The purifier there shown is of the low pressure type. Its shell or casing 2, completed by the top and bottom heads 3 and 4, is preferably cylindrical; and, its height several times exceeds its diameter. Midway, it contains a floor or horizontal partition 5, and is thereby divided into the two parts above described, namely, the settling chamber A and the superimposed heating chamber B. The steam inlet is marked 6; the water inlet 7; and, the water outlet 8. The low water level of the machine is marked by the floor 5. The actual level, as well shown in Figure 1 may vary between that point and a much higher level in the chamber B. Thus a large water capacity is provided; it being understood that the chamber A is also always full of water.

The particular machine here shown is intended for use with steam at substantially atmospheric pressure and a relatively large volume of steam being required the steam pipe 6 is of large diameter. Its lower end opens through a larger opening 3' provided in the top 3. That opening is surrounded by a water distributing trough 9, within the head 10 and receives water from the pipe 7. Incidentally, the chemicals that may be required to promptly secure chemical equilibrium in the water are supplied through the branch pipe 11, which enters the pipe 7.

Obviously, the steam from the pipe 6 and the water which overflows the distributing trough 9, enter the chamber B together and are intimately mixed. Further, the steam forcibly contacts the upper surface of the columnar body of water within the machine. Thus, the steam is rapidly condensed and its heat is communicated to the water.

By way of ensuring a more rapid interchange of heat, means are provided for finely subdividing the entering streams of water and steam and bringing them into violent and intimate contact. Such means preferably comprise a tangentially bladed, but fixed, whirl-promoting tuyère 12, having a preferably imperforate top 12' and supported by the horizontally positioned ring 13. The tangential blades 12ᵃ most clearly appear in Fig. 2 and together form a large number of slit-like tangential tuyères 12ᵇ.

The first mixture of the steam and water occurs at the lower end of the pipe 6 where the steam, in order to enter the tuyère 12, must pass laterally through the annular stream of water falling from the trough 9. Much of the steam is there immediately condensed. The remaining mixture of steam and water passes inwardly through the tangential tuyères 12ᵇ and is thereby organized into a whirling body within the chamber B. In consequence of the whirling action both the water and steam are thrown outward from the open lower end 12ᶜ of the tuyère 12 and are further forced to mix in whirling condition upon or against the restraining walls of the chamber B. Further, as all the supplied steam is not condensed, the whirling action continues in the space B, resulting in the vigorous rotation of all the water above the floor 5 and violently disturbing the surface of the water, bringing about a further condensation and heat interchange. Again, the vortexial action in the chamber B brings about the elevation of much of the water at the axis of the machine, and results in spraying and mixing the water into the atmosphere of steam that constantly occupies the free part of the chamber B. The sum total of condensation approaches but does not reach completion due to the abundant supply of steam and the raising of the water to steam temperature, beyond which condensation will not progress, clearly a water temperature substantially equal to that of the entering steam is certain to be maintained. This is a matter of special importance for thereby, and particularly in the case of these purifiers which operate at higher steam pressures, it becomes possible to maintain temperatures that are fully adequate to the freeing and separation of substances that would remain in solution were it not for the attainment of temperatures that convert them either into denser fluids or immediately precipitable solids. As stated a superabundance of steam is or should be supplied to the machine, always having reference to the rate at which the water is fed into the same at the inlet connection 7; and, the water should be withdrawn at about the same rate in order that a considerable body of water shall always be maintained in the heating chamber B.

The mixing device here described is of extremely simple construction, does not involve movable or rotating parts, and is extremely efficient, also self-cleaning. The mixing device together with the other parts comprising the upper portion of the machine completes a heat interchanger that may be depended upon to communicate heat to the water with maximum rapidity and thus permits the water to be fed into and withdrawn from the machine at such a rate that considered as a water heater its production capacity is very high. The capacity of the machine as a water purifier will now be discussed and shortly it will be observed that the actual separation of the impurities from even very impure hot water is accomplished with such facility as to avoid any material lessening of the delivery capacity of the machine.

But first it should be explained that the heating of the water immediately drives off the contained gases or the greater part thereof, and the gases, accumulating at the top of the heating chamber, are discharged through the relief pipe 14. Thus that important part of the purifying process is accomplished at once.

The heating of the water hastens the approach toward chemical equilibrium, and definitely conditions the solid impurities for separation from the water, and also serves to solidify and thus prepare for separation many of the foreign substances which were in a dissolved state in the original cool water.

As before stated, the purified water is taken off at the top of the settling chamber A. Hence the violently agitated hot water carrying impurities conditioned for separation as above described must pass downward from the chamber A and into at least the top of the settling chamber in order to find relief at the outlet of the machine. Advantage is taken of that downward movement not only to deliver the water to the settling chamber but also to accomplish therein a definite separation of the impurities and thus allow the water to be discharged from the top of the settling chamber in a purified state.

To the end that the water in the settling chamber shall be as little as possible disturbed by the movement toward the outlet, the communication between the two chambers is restricted to a relatively small opening 15 in the floor 5. At the same time that opening though small is made several times larger than the water inlet 7 and water outlet 8, meaning that the velocity of downward movement is also deliberately restricted. The restriction of communication does not prevent the communication of heat, and the water in the settling chamber is kept at proper temperature, but such restriction does prevent the violent agitation in the heating chamber B from disturbing the settling chamber A; and, the concurrent restriction of velocity restricts the downward penetration of the forces substantially to the upper part of the settling chamber. Thus the agitation of the chamber A is obviated and the various substances entering the same through the top opening 15 are permitted to quietly settle and stratify therein. Further measures to the same end, namely to prevent the exit of impurities from the settling chamber, attend the operation of positive filtration as well depicted in Fig. 1.

As shown in Figs. 1 and 3 the margin of the hole 15 is marked by a depending flange 15'. A gas space 16 is thereby formed in the top of the chamber A. 16' represents the relief pipe leading away from the space 16. The actual opening 15 is of annular or ring-like shape, comprising the space between the flange 15' and the lower end of the inverted cone 17 to which the pipe 8' is connected. Usually the parts 15' and 17 are joined by radial ribs 18, as shown in Fig. 3. The actual outlet of the machine comprises the annular opening 19 existing between the lower edge or margin 17' of the part 17 and the upper edge 20' of the part 20. The opening 19 obviously is of large diameter but of little height and its area not much exceeds that of the outlet 8. The part 20 is an inclined or conical top for the inner casing 21.

The upper end of the truncated cone 20 is coaxial with the part 17 but is of less diameter so that the margin 17' overhangs it. The lower end of the part 20 is of larger diameter than the part 17 and thus the conical or inclined surface 20'' is directly presented to the down-moving annular stream from the annular opening 15. The velocity of that stream though low is sufficient to carry the downward stream across or past the annular outlet 19 and thus the impurities are initially prevented from entering the outlet. The impingement of the stream against the inclined or conical surface 20'' results in the deflection of the stream toward the walls of the casing 2, aiding the other measures in preventing the deep penetration of the stream and tending to leave the lower part of the chamber undisturbed. The heavier substances more effectively resist dispersion and sink quietly to the bottom of the chamber A.

Meantime the deflection of the stream, the absorption of its energy against the liquid banked in the chamber A coupled with the necessity for relief at the outlet 19, result in a rotative and upward movement of the liquid adjacent the wall of the casing and generally toward the outlet 19. By such rotation or vortexial action sufficient centrifugal force is developed to ensure the expulsion of the remaining heavy substances, either fluid or solid, so that they may settle in the chamber A; and also occasions the separation and delivery of the lighter substances to the space 16 at the top of the chamber A, from whence they are discharged through pipe 16'.

The unburdened or purified liquid is permitted to slowly approach the outlet 19 because of the large space surrounding the same. But in order to reach the outlet the liquid must actually penetrate the downward moving annular stream of burdened or impure liquid from the chamber B. Thus the latter is employed as a final filtering medium for the escaping liquid and by reason of the greater energy of the downward or incoming stream any impurities seeking to escape are re-entrained and again thrown downward by the entering stream. Thus the outlet 19 is well defended by forces that operate positively while at the same time those forces are so restricted and localized as to prevent the disturbance in the lower parts of the settling chamber A.

By preference the conical upper end of the member 21 is left open as shown in Fig. 1 and thereby the annular outlet 19 is made to become a restricted inlet leading into a relatively large expanding chamber; to wit, the large space 22 existing within the parts 17 and 21. It follows that the liquid entering that chamber 22 suffers a sudden loss of velocity therein and hence any solids conveyed thereby will be settled out and allowed to fall into the bottom of the chamber 22; leaving only the pure liquid to rise into the pipe 8' and escape at the outlet 8.

Any suitable means such as the trap door 23 may be employed for emptying the pocket 22. The door 23 may be reached through the man-hole 24. Drain connections 25, 26 and 27, of any suitable construction determined by the character of the substances to be discharged, are provided for draining the chamber A at different levels therein.

If desired the accumulated solids may remain in the bottom of the machine for some time, but in dealing with strongly saline waters it is better to drain off the salt solution more frequently. This may be done by opening the drain or drains (27) at the higher level or levels. It is presumed that it will be understood that such heavier fluids are reliably separated and quite definitely stratify in the quiet lower part of the machine; that is, below the described separator or filter by which the outlet is defended.

Those skilled in the art will understand that in practice the various supplies to, and withdrawal from the machine, and hence the temperatures and flows, may vary within considerable ranges without modifying the actions above defined, but that to gain best results in any given case all the controlling factors should be kept as nearly as possible constant. To this end the machine is normally equipped with the necessary gages, valves, regulators and the like by which the conditions within the machine may be observed and controlled. Such auxiliaries are too well known and understood to require illustration herein, and in most instances have been entirely omitted for sake of clarity.

Those skilled in the art will also understand that while this is essentially a continuous process as contrasted with the "batch" treatment of a liquid, its continuity is not negatived by temporary interruptions of liquid flow, nor even by a cessation of steam supply, for during such periods the gravity separation of the foreign substances progresses and may progress even to the point of entire completion so that the first liquid leaving the machine following re-establishment of the flow may be entirely free from all impurities that could be removed at the temperature ruling at the moment. However, it is obvious that the intended and the practically necessary use of the process requires the truer continuity of action exemplified in the foregoing descriptions.

Qualified by the foregoing explanations, this process of liquid purification will now be understood generally to comprise the treatment of a flowing stream of liquid which at one point in its travel is accumulated in a body of considerable volume and extended height and divided into upper and lower portions that are in restricted communication, the liquid being admitted, and heated to a predetermined temperature, at the top of said body and flowing thence downward into the lower portion of the body, and, the liquid being taken off approximately at the level of restricted communication; whereby the foreign substances are first prepared for separation in the upper portion of the body and then according to their respective weights are separated out at the top or bottom, or both, of said lower portion, and only the purified liquid is permitted to leave the lower body. Relying upon this brief description it should be an easy matter to practice the invention successfully. The attendant steps of the process have been so clearly stated in the preceding description that it is believed to be unnecessary to similarly summarize them at this point.

It may be here noted that in the treatment by the process of non-aqueous liquids that are lighter than water, steam may still be employed as the heating agent for the condensate thereof will be automatically separated out and left in the bottom of the machine. In the treatment of non-aqueous fluids that are heavier than water other heating agents may be employed, but even in such cases steam may still be used provided care is observed in draining the aqueous condensate from the top of the separating chamber where it will accumulate because of its lesser weight.

The liquid purifying machine here described is well named "filtering heater" and is adapted for employment in many industries. It is particularly admirable in that it is free from moving parts and yet is so constructed as to bring about necessarily forceful and violent actions within itself. Further without detrimental effect and even with assurance of improved effects, the machine may be made in large sizes; and in such sizes still possesses the advantage of occupying little valuable space.

These machines though not so shown are usually externally insulated to avoid unnecessary loss of heat. The insulation of steam heated machines is of generally understood nature and therefore has not been illustrated herein. This statement applies to all of the drawings.

Refer now to Fig. 4. Therein two of these filtering heaters are shown. Both operate upon the principles above explained but they are arranged in tandem and work at successively higher temperatures.

The machine marked No. 1 is identical with that of Fig. 1, except that a simple inclined baffle 28 is relied upon to direct the steam from the large low pressure steam inlet 6$^a$ and cause the necessary violent rotation and mixing action in the chamber B$^2$. A minor difference will also be observed in the shape of the inner casing or member 21$^a$, supported beneath the offtake dome 17$^a$. The part 21$^a$ is here provided with a hopper bottom and a suitably valved pipe 29 for the separate discharge of the small quantity of impurities collected beyond the outlet 19$^a$.

The machine marked No. 2 is intended for use with high pressure steam and accordingly is characterized by a heavy shell and dished ends or heads. The mixing arrangement also differs from that before described, comprising a simple dome 30 positioned eccentrically over an opening 31 in the top of the machine. The high pressure steam enters through the pipe 32 and being angularly directed into the space B$^3$ assumes the rotary motion indicated by the arrows. The water enters the side of the dome 30, from a pipe 33, and an effective mixing and condensing operation is accomplished. Clearly, the high pressure machines of this invention are not limited to mixers of this type. Mixers of other types, perhaps more efficient, may be substituted; and as the volume of steam to be handled is necessarily smaller than in the low pressure machine, care should be observed in the design of the mixer. Mixers of other types that may be used will be described hereinafter. The filter portion of the No. 2 machine operates as before described and differs only in the shapes of the parts 17$^b$ and 21$^b$. The latter is constructed to discharge its accumulations directly into the bottom of the larger vessel.

The purified water is drawn from the No. 1 machine, as by a pump 34 and is thereby delivered to the pipe 33 and hence to the No. 2 machine.

From the foregoing description, it will be understood that the water is drawn from the No. 1 machine in that state of purification which is characteristic of the temperature at which No. 1 machine is worked. The No. 1 machine is limited in that regard by the temperature and quantity of the low pressure steam supplied thereto. Operating at such temperature it may be depended upon to throw down practically all the impurities, but there remains a quantity of, frequently most detrimental, impurities which should be removed from the water. These are cared for in the No. 2 machine; and if necessary the operation may be repeated in succeeding machines at still higher temperatures. However as here shown it is presumed that the No. 2 machine shall operate with steam at pressures exceeding 150 pounds and therefore at temperatures equaling or exceeding 360° F., which in the case of water is adequate to the separation of the most difficult of scale forming solids.

Reverting now to Fig. 4, it will be seen that the machines (No. 1 and No. 2) are there shown in proper relations to the steam boilers 51, thereby supplied with pure feedwater. Further a connection 52 permits a supply of live steam from the boiler direct to the high pressure machine No. 2. If that be not needed and a supply of steam perhaps at lower pressure but still adequate as to temperature is available as from a turbine bleeder pipe 53, the valve in the pipe 52 may be closed and the bleeder steam used in the No. 2 machine.

It is not generally feasible to pump water at these high temperatures and therefore the No. 2 machine is positioned above the boilers so that a suitably regulating flow of feedwater may pass directly to the boilers by gravity, as through the pipe connections 54, 55, 56 and 57.

When the lower but adequate pressure steam is employed from the connection 53, it becomes necessary to employ a centrifugal booster pump as shown at 58, to feed the water against boiler pressure, the same being positioned in a suitable by-pass 59.

When hot condensate is available as from a main 60, the No. 1 machine may be cut out and the condensate, passing through a by-pass 61, may be delivered, by pump 34, direct to the high pressure machine No. 2. Any small deficiency of water required by the boilers may safely be supplied direct to the high pressure machine as by a small high pressure make-up pump 62.

The system is suitably valved throughout and as before explained is presumed to be properly insulated throughout and to be controlled by proper regulators.

The various portions of Fig. 4 have been carefully indicated thereon, and it is believed that the drawing and the functions of the several parts will be fully understood even without regard to the reference numerals. However it should be carefully noted that therein appears a complete system of heat conservation. First, provision is made for the utilization of exhaust steam from various parts of the plant, practically all of the heat thereof being recovered in the feed-water issuing from the No. 1 machine. And next, provision is made for the employment of a minimum volume of live steam in the No. 2 machine, the steam issuing either from the bleeder pipe 53 or directly from the boiler. In the latter case the steam is directly expended in the necessary step of purifying the feed-water thus ensuring better boiler operation. Such expenditure is warranted because of the value of feed-water preparation and further the cost in heat is very small because of the immediate recovery of practically all of the heat within the high temperatured feed-water. The actual heat loss is of course that of radiation and it is assumed that such radiation will be minimized by proper insulation of the several parts.

From the foregoing it should also be understood that if desired the No. 2 machine, or the number of counter-parts required to take advantage of multiple stage bleeder operations, may be used solely with bleeder steam for the purpose of purifying liquid for any desired use.

Having thus described my invention I claim as new and desire to secure by Letters Patent:

1. The herein described improvement comprising a filtering heater that is composed of a vertically extended casing having steam and water admission means at the top and the lower part of which is provided with draining means, in combination with whirl-promoting and mixing means at the top of said casing, a partition forming the lower part of said casing into a settling chamber and leaving the upper and lower parts of the casing in restricted communication, and, a purified liquid outlet leading from the upper part of said settling chamber.

2. The herein described improvement comprising a filtering heater that is composed of a vertically extended casing having steam and water admission means at the top and the lower part of which is provided with draining means, in combination with a whirl-promoting and mixing tuyère at the top of said casing, a partition forming the lower part of said casing into a settling chamber and leaving the upper and lower parts of the casing in restricted communication, and, a purified liquid outlet leading from the upper part of said settling chamber.

3. The herein described improvement comprising a filtering heater that is composed of a vertically extended casing having steam and water admission means at the top and the lower part of which is provided with draining means, in combination with a mid-partition that divides said casing into superposed heating and settling chambers, said partition containing an opening for the downward movement of liquid from the heating chamber into the settling chamber, and liquid outlet means positioned centrally in said opening.

4. The herein described improvement comprising a filtering heater that is composed of a vertically extended casing having steam and water admission means at the top and the lower part of which is provided with draining means, in combination with a mid-partition that divides said casing into superposed heating and settling chambers, said partition containing an opening for the downward movement of liquid from the heating chamber into the settling chamber, liquid outlet means positioned centrally in said opening, and a member positioned below and coacting with said outlet means in the formation of an annular liquid outlet within the confines of but below the opening in said partition.

5. The herein described improvement comprising a filtering heater that is composed of a vertically extended casing having steam and water admission means at the top and lower part of which is provided with draining means, in combination with a mid-partition that divides said casing into superposed heating and settling chambers, said partition containing an opening for the downward movement of liquid from the heating chamber, into the settling chamber, liquid outlet means positioned centrally in said opening, a member positioned below and coacting with said outlet means in the formation of an annular liquid outlet within the confines of but below the opening in said partition, a supplementary settling chamber which receives the liquid from said liquid outlet and an offtake duct leading from the top of said supplementary chamber.

6. The herein described improvement comprising in combination, low and high pressure filtering heaters each composed of a vertically extended casing having steam and water admission means at the top and the lower part of which is provided with draining means, a mid-partition that divides said casing into superposed heating and settling chambers and restricts the downward flow of liquid from one to the other, a liquid outlet leading in each case from the top of the separating chamber, a duct leading from the outlet of the low pressure heater to the water admission means of the high pressure heater, means for supplying low pressure steam to the admission means of the low pressure heater, and means for supplying high pressure steam to the admission means of the high pressure heater.

In testimony whereof I have hereunto set my hand this 28th day of July, A. D., 1926.

CHARLES GILBERT HAWLEY.